United States Patent [19]

Ulug

[11] Patent Number: 4,682,326

[45] Date of Patent: Jul. 21, 1987

[54] METHOD AND APPARATUS FOR MAINTAINING A DYNAMIC LOGICAL RING IN A TOKEN PASSING LAN

[75] Inventor: Mehmet E. Ulug, Schenectady, N.Y.

[73] Assignee: General Electric Company, Schenectady, N.Y.

[21] Appl. No.: 802,482

[22] Filed: Nov. 27, 1985

[51] Int. Cl.⁴ .............................................. H04J 3/26
[52] U.S. Cl. .................................... 370/89; 340/825.5
[58] Field of Search ...................... 370/85, 86, 89, 94; 340/825.05, 825.06, 825.07, 825.5, 825.51

[56] References Cited

U.S. PATENT DOCUMENTS

| | | | |
|---|---|---|---|
| 4,058,681 | 11/1977 | Imaizumi | 179/15 |
| 4,491,946 | 1/1985 | Kryskow, Jr. et al. | 370/89 |
| 4,494,233 | 1/1985 | Bahr et al. | 370/86 |
| 4,506,360 | 3/1985 | Kryskow, Jr. et al. | 370/85 |
| 4,507,777 | 3/1985 | Tucker et al. | 370/16 |
| 4,583,088 | 4/1986 | Bux et al. | 370/86 |
| 4,593,280 | 6/1986 | Grow | 370/86 |
| 4,609,920 | 9/1986 | Segarra | 370/86 |

*Primary Examiner*—Douglas W. Olms
*Attorney, Agent, or Firm*—Richard V. Burgujian; James C. Davis, Jr.; Paul R. Webb, II

[57] ABSTRACT

Method and apparatus are provided for maintaining a dynamic logical ring in a token passing local area network wherein a plurality of bus interface units (BIUs) exchange information in accordance with a token passing protocol. A network control center is provided for monitoring the transmission medium of the network for transmission of a media demand signal, wherein said media demand signal indicates that a station wishes to be added to the logical ring. The network control center is responsive to the media demand signal for determining a predecessor and successor to the entering station and, thereafter, transmitting media entrance signals to add the entering station to the logical ring. To this end, one media entrance signal is transmitted to the predecessor of the entering station to inform the predecessor to transmit the token to the entering station and another media entrance signal is transmitted to the entering station to inform the entering station to transmit the token to its successor. The network control center is also adapted to monitor the transmission medium to determine when a station has received the token and then failed. Upon making such a determination, the network control center will transmit message signals to remove the failed station from the logical ring.

14 Claims, 8 Drawing Figures

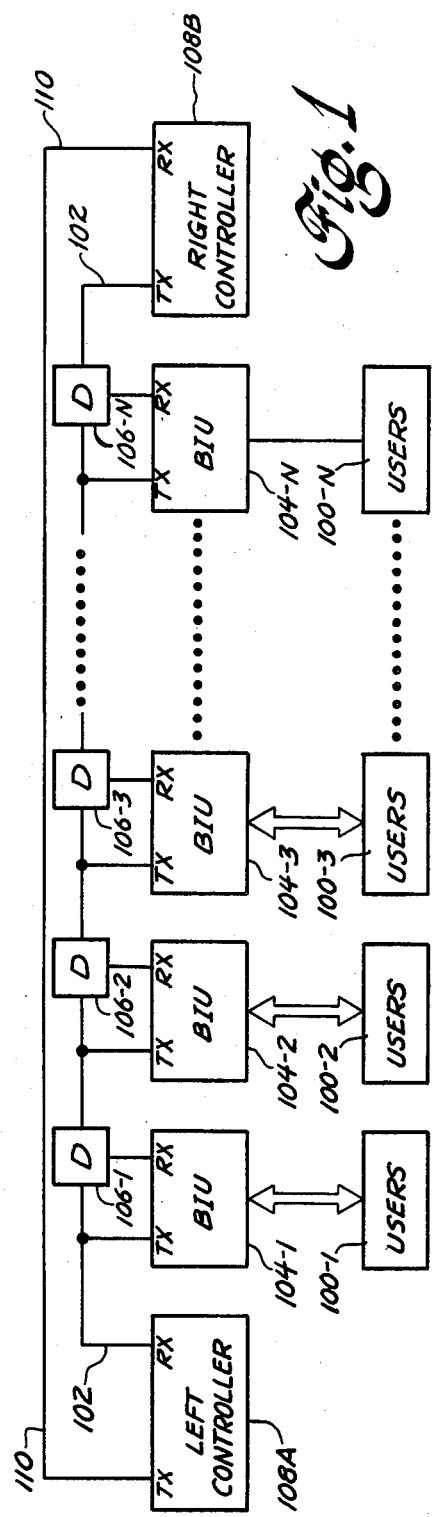
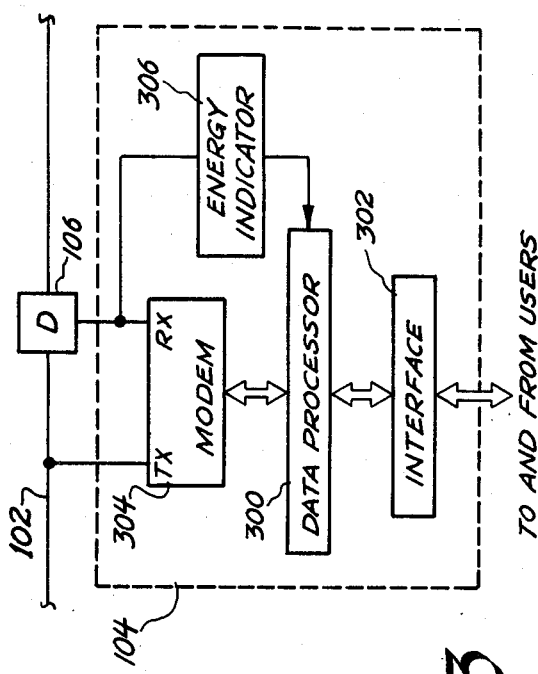
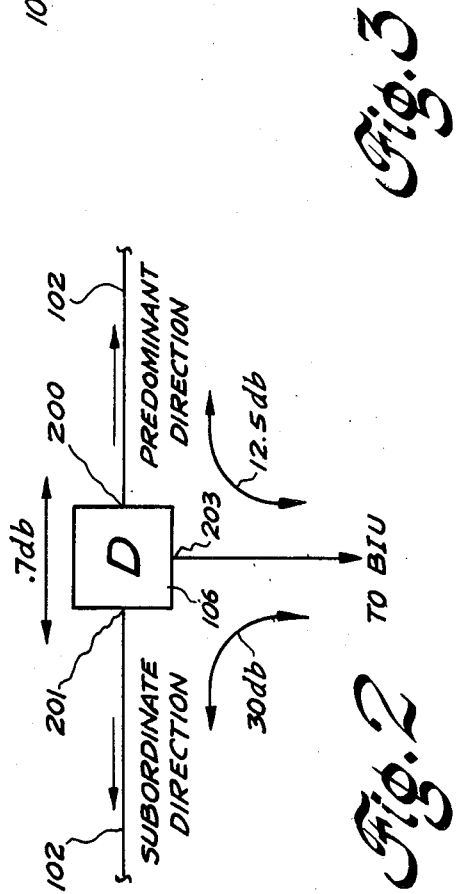

METHOD AND APPARATUS FOR MAINTAINING A DYNAMIC LOGICAL RING IN A TOKEN PASSING LAN

BACKGROUND OF THE INVENTION

The present invention relates in general to local area networks and, more particularly, to method and apparatus for maintaining a dynamic logical ring in a token passing local area network.

Local area networks (LANs) are becoming more and more prevalent in today's world. With this widespread acceptance comes the need to improve both the speed and efficiency of these systems. The present invention provides method and apparatus for improving the speed and efficiency of a token passing LAN by maintaining a dynamic logical ring.

In a token passing local area network, a plurality of bus interface units (BIUs) are coupled to a common transmission line for transmitting information packets therebetween. Each BIU, or node, is permitted to transmit only while in control of the token. The token is passed from BIU to BIU in accordance with the order of the logical ring.

Logical ring, as used herein, refers to a list which prescribes the order in which the token is passed from BIU to BIU. In most LANS the logical ring need prescribe no particular order in which to pass the token, the only limitation being that each BIU listed in the logical ring must be able to receive the token and, thereafter, transmit the token.

In token passing local area networks, it is desirable to maintain a dynamic logical ring, i.e., a logical ring which only passes the token to active BIUs, thereby reducing the token rotation time. However, prior art protocols, such as that described in IEEE Project 802 Local Network Standards, Draft C, Section 4 (1982), for adding or removing BIUs to and from the logical ring incur delays caused by the departing, entering and soliciting BIUs which make the mean bus access delay unacceptable for real time operations.

Particularly, prior art protocols require that the entering BIU be solicited by a participating BIU. Thus, a BIU wishing to enter the ring cannot unilaterally initiate participation in the local area network. Further, a BIU wishing to enter the network can only be solicited by a particular one of the BIUs already participating therein. Hence, additional delay is incurred until that particular BIU solicits prospective entrants to the ring.

Also, prior art protocols for adding and removing BIUs to and from the logical ring incur additional delays in information transfer when more than one prospective entrant responds to an entrant solicitation, i.e., a collision occurs. In such instances, information transfer is suspended while the several responding prospective entrants determine which will be added to the logical ring. Hence, prior art protocols incur substantial delays in information transfer during the intervals when a contention for entrance between several BIUs is being resolved.

Similarly, when a BIU fails, and therefore cannot transmit the token to its successor, the logical ring must be re-established. Prior art protocols for reestablishing the logical ring incur unacceptable delays in determining the new successor to the failed BIU's predecessor, i.e., re-establishing the ring. This is especially so when two or more successive BIUs fail simultaneously.

SUMMARY OF THE INVENTION

The present invention addresses the foregoing inadequacies of the prior art by providing method and apparatus for maintaining a dynamic logical ring in a token passing local area network wherein a media control signal is transmitted from station to station to transfer the right to transmit message signals in the network. The network includes a plurality of active and passive stations, the active stations being adapted to transmit the media control signal from a predecessor station to a successor station in accordance with the order of the logical ring and the passive stations being adapted to enter the network by transmitting a media demand signal.

A network control center is provided and adapted to be coupled to the local area network to monitor and maintain the logical ring thereof. The network control center comprises a transceiver and a data processor for transmitting message signals to and from the local area network transmission medium. The data processor is responsive to media demand signals, transmitted by an entering station to indicate its desire to be added to the logical ring, for searching a memory device to determine a predecessor and successor for the entering station. The data processor is further responsive to the media demand signal to transmit media entrance signals to add the entering station to the logical ring. To this end, one media entrance signal is transmitted to the predecessor of the entering station to inform the predecessor to transmit the media control signal to the entering station and one media entrance signal is transmitted to the entering station to inform the entering station to transmit the media control signal to its successor.

A local area network is provided which includes, in addition to a network control center, a transmission medium and a plurality of bus interface units (BIUs). The BIUs are provided and coupled to the transmission medium for transmitting and receiving message signals therebetween. Each bus interface unit is adapted to transmit message signals while in control of the media control signal to thereby provide intercommunication between a plurality of user devices. Each BIU is adapted to operate in an active mode wherein it is included in a logical ring or in a passive mode during which it is not part of the logical ring. The bus interface units are further adapted to transmit media demand signals when the transmission medium is idle to indicate that a station on the network wishes to enter the logical ring.

A novel method is also disclosed for adding prospective entrants to the logical ring. In accordance therewith, the transmission medium of the network is monitored for transmission of a media demand signal. Upon detection of the media demand signal, the predecesssor and successor to the entrant are determined and media entrance signals are transmitted to add the entrant to the logical ring.

It is, therefore, an object of the present invention to improve the overall speed and efficiency of a token passing local area network by providing method and apparatus for maintaining a dynamic logical ring therein.

It is also an object of the present invention to provide apparatus adapted for coupling to a local area network which apparatus is provided for maintaining a dynamic logical ring in the network.

It is a further object of the present invention to provide an improved method for intercommunication in a local area network, which method will allow the bus interface units of the network to freely and unilaterally initiate participation therein.

BRIEF DESCRIPTION OF THE DRAWINGS

Subject matter which is regarded to be invention is particularly pointed out and distinctly claimed in the numbered paragraphs appended hereto. The invention, however, both as to organization and method of practice, may best be understood from a reading of the following detailed description taken in conjunction with the drawings in which:

FIG. 1 is an illustrative block diagram of a local area network which uses method and apparatus according to the present invention;

FIG. 2 provides a more detailed illustrative block diagram of the directional coupling units of the local area network of FIG. 1;

FIG. 3 provides a more detailed illustrative block diagram of the bus interface units (BIUs) of the local area network of FIG. 1;

DETAILED DESCRIPTION OF THE DRAWINGS

Figure 4:
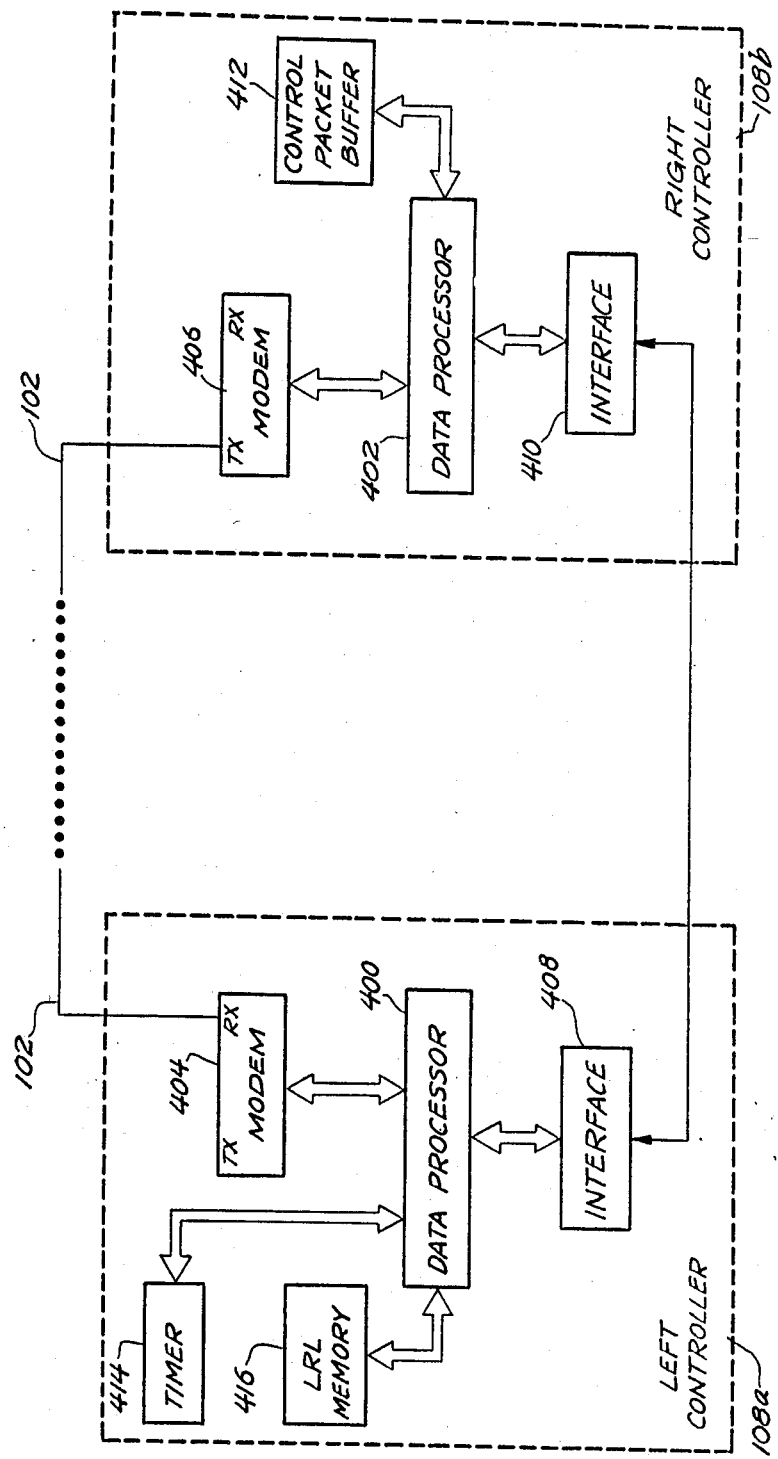
FIG. 4 provides a more detailed illustrative block diagram of the network control center of the local area network of FIG. 1.

As mentioned hereinabove, the subject invention is directed to a method and apparatus for maintaining a dynamic logical ring in a token passing local area network (LAN). As such, the subject invention represents an improvement upon known token passing protocols such as that described in IEEE Project 802 Local Network Standards, Draft C, Section IV (1982), hereinafter, IEEE 802.4 Standards.

A local area network, including apparatus which is the subject of the present invention, is shown in FIG. 1. Therein, a plurality of user devices 100-1 through 100-N are shown coupled to a transmission medium 102 via a plurality of respective bus interface units (BIUs) 104-1 through 104-N. User devices 100 may comprise any of a plurality of autonomous devices typically found in local area networks. As an example, user devices 100 may comprise personal computing devices, printing devices, memory devices, automated manufacturing devices, etc. While only one user device 100 is shown coupled to each BIU 104 in FIG. 1, it will be appreciated by those skilled in the art that a plurality of user devices 100 may be coupled to each BIU 104 for communication with transmission medium 102.

Transmission medium 102 may comprise any means for transmitting electrical and/or fiber optic information signals between user devices 100 via BIUs 104 as is known in the art. As an example, transmission medium 102 may comprise a coaxial cable, as available from the Belden Electric and Wire Cable Company, for transmitting alternating current modulated digital information signals. As a further example, transmission medium 102 may comprise high performance fiber optic cable, such as that available from the Hewlett Packard Company, part no. HFBR3001, for transmitting optically modulated digital information signals.

Each BIU 104-1 through 104-N is coupled directly to transmission medium 102 for transmitting message signals thereto. Each BIU 104-1 through 104-N is also coupled to transmission medium 102 via a respective directional coupling unit 106-1 through 106-N for receiving message signals therefrom. Directional coupling units 106 are provided for filtering transmitted message signals such that each BIU 104 may only receive message signals transmitted by BIUs which are coupled to transmission medium 102 in a particular direction, referred to herein as the predominant direction.

With reference to FIG. 2, there is shown a more detailed illustrative block diagram of each directional coupling unit 106. As shown therein, each directional coupling unit 106 provides a first minimum attentuation factor (approximately 0.7 db.) in the transverse direction, that is between ports 200 and 201 along transmission medium 102. A second moderate attenuation factor (approximately 12.5 db) is provided between the right end port 200 (as seen in FIG. 2) and the BIU port 203 of directional coupling unit 106. A third high attenuation factor (approximately 30 db) is provided between the left end port 201 and the BIU port 203 of directional coupler 106. Hence, transmissions originating from the right end port 200 of the directional coupling unit will be transferred thereacross to the left end port 201 with minimum attenuation thereto. Transmissions originating from the right end port 200 of the directional coupling unit will be transferred to the BIU port 203 with moderate attenuation thereto and transmissions originating from the left end port 201 of the directional coupling unit will be transferred to the BIU port 203 with maximum attenuation thereto.

Each BIU 104 is coupled to receive transmissions from the BIU port 203 of its respective directional coupling unit 106. Therefore, directional coupling unit 106 is provided to allow the BIU to receive message signals which are transmitted from its right end port 200 and further to inhibit reception of transmissions which originate from its left end port 201. The directional coupling unit 106, therefore, creates a predominant direction and a subordinate direction, as indicated in FIG. 2, wherein transmissions originating from the predominant direction will be received by the subject BIU via ports 200 and 203. Conversely, transmissions originating from the subordinate direction, and received at port 201 of the directional coupler, will not be transferred to port 203 and, hence, will not be received by the subject BIU. BIUs coupled to transmission medium 102 (FIG. 1) in the predominant direction with respect to a subject BIU may be considered predominant to the subject BIU and, similarly, BIUs coupled to transmission medium 102 in the direction subordinate to a subject BIU may be considered subordinate BIUs to the subject BIU.

Directional couplers 106 may comprise any combination of devices adapted for providing the selective coupling function described above. As an example, each directional coupling unit may comprise a directional coupler as shown and described in U.S. Pat. No.

4,517,670, to Ulug, the disclosure of which is incorporated herein, in its entirety, by the foregoing reference thereto.

As mentioned hereinabove, BIUs 104-1 through 104-N are provided for interfacing a respective user device 100 with transmission medium 102 such that intercommunication may be provided between each user of the network. Each BIU 104 is adapted for transferring and receiving message signals to and from transmission medium 102 in accordance with the IEEE 802 Standard Token Passing Protocol as described in the aforereferenced IEEE 802.4 Standards. The operation of each BIU 104 may best be described by reference to FIG. 3 wherein a more detailed block diagram of each BIU 104 is provided. It will be appreciated by those skilled in the art that while only one BIU 104 is shown in FIG. 3, that each BIU 104-1 through 104-N is constructed and operates in a manner similar to BIU 104 of FIG. 3.

Referring to FIG. 3, each BIU 104 is shown to comprise a data processor 300 adapted for transferring user message signals to and from users 100 (not shown) via an interface 302. Interface 302 may comprise any integrated logic circuitry for adapting information signals from data processor 300 for use by users 100 and, conversely, adapting user message signals from users 100 for use by data processor 300. As an example, interface 302 may comprise buffers, registers, timing devices, latches, random access memory, read only memory, etc. Data processor 300 is provided for receiving user message signals from users 100 and for adapting these message signals for transmission to transmission medium 102 via a modem 304.

Modem 304 is provided for receiving digital data signals from data processor 100 and for modulating these signals upon an alternating current carrier such that they may be transmitted to transmission medium 102. Further, modem 304 is provided for receiving alternating current modulated digital information signals from directional coupling unit 106, for demodulating these signals to recover the digital information contained therein, and for transferring this digital information to data processor 300. As such, modem 304 may comprise any means for transmitting and receiving alternating current modulated digital signals between transmission medium 102 and data processor 300. As an example, modem 202 may comprise a model 30-0078-3 modem, as available from the Computrol Corporation, for receiving and transmitting alternating current modulated digital signals. Alternatively, should transmission medium 102 be adapted for transmission of fiber optic digital signals, then modem 202 may comprise a fiber optic transmitter, and a fiber optic receiver for transmitting and receiving optically modulated digital information signals over transmission medium 102.

As mentioned above, data processor 300 is provided for receiving digital information signals from user's 100, for preparing these digital information signals for transmission on transmission medium 102, and for transmitting these digital information signals to transmission medium 102 in accordance with the standard token passing protocol as modified by the methods of the subject invention. Data processor 300 may, therefore, comprise any signal processing apparatus for implementing the token passing protocol as described herein. As an example, data processor 300 may comprise a microprocessing device including peripheral digital elements, e.g., latches, timers, memory, etc., adapted for interfacing a plurality of user devices 100 with transmission medium 102. As an example, see the aforereferenced U.S. Pat. No. 4,517,670, to Ulug. Alternatively, each BIU 104 may be purchased as a single integrated device, and, thereafter, programmed for implementing the method as described herein. As an example, each BIU 104 may comprise a model SBC86/51 bus interfacing unit as available from the Intel Company.

An energy indicator 306 is provided and coupled to directional coupling unit 106 for providing an indication to data processor 300 that a message signal is being received. As such, energy indicator 306 may comprise any means for providing an indication that energy has been received from the directional coupling unit 106. As an example, energy indicator 306 may comprise an energy detect circuit such as that shown and described in the aforereferenced U.S. Pat. No. 4,517,670, to Ulug.

Returning to FIG. 1, a network control center 108 is shown to comprise a left controller 108A and a right controller 108B coupled to transmission medium 102 and interconnected via a dedicated connection 110. Network control center 108 is provided for maintaining the logical ring of the local area network of FIG. 1 such that BIUs 104-1 through 104-N may freely and unilaterally initiate participation therein. To this end, network control center 108 is provided for monitoring transmission medium 102 for transmission of a media demand signal, which may comprise a next neighbor signal as described in the aforereferenced 802.4 Standards, and is responsive thereto for adding the originating BIU to the logical ring, as described more fully hereinbelow by reference to FIGS. 5 and 6. With reference to FIG. 4, there is provided a more detailed illustrative block diagram of network control center 108.

As shown in FIG. 4, left controller 108A of network control center 108 comprises a data processor 400 coupled for intercommunication with a data processor 402 of right controller 108B via an interface 408 and an interface 410. Interfaces 408 and 410 may comprise devices similar to interface 302 of FIG. 3. Similarly, left controller 108A is coupled for receiving alternating current modulated digital message signals from the transmission medium 102 via a modem 404. In similar manner, right controller 108B is coupled for transmitting alternating current modulated digital message signals to transmission medium 102 via a modem 406. Modems 404 and 406 may comprise devices similar to modem 304 of FIG. 3.

Like data processor 300 of FIG. 3, data processors 400 and 402 may comprise any signal processing circuitry adapted for communicating with transmission medium 102 in accordance with the token passing protocol as modified herein. It will be appreciated by those skilled in the art that while data processors 400 and 402 may comprise devices similar to data processor 300 of FIG. 3, data processors 400 and 402 will contain programmable processing apparatus programmed for implementing the particular methods as described hereinbelow with reference to FIGS. 5 and 6. Hence, as described hereinabove with reference to BIU 104 of FIG. 3, left controller 108A and right controller 108B may comprise devices similar to those disclosed in U.S. Pat. No. 4,517,670, to Ulug. Additionally, left controller 108A and right controller 108B may comprise the aforereferenced model SBC86/51 bus interfacing unit available from the Intel Company. Alternatively, data processors 400 and 402 may comprise microcomputing devices including the necessary peripheral devices as described in U.S. patent application Ser. No. 802,287, filed Nov. 27, 1985, by Ulug, and assigned to the assignee of the present invention, that disclosure of which is incorporated herein, in its entirety, by the foregoing reference thereto.

Data processor 402 is coupled to a control packet buffer 412 for temporarily storing packets to be transmitted to transmission medium 102. Control packet buffer 412 is provided for temporarily storing message signals to be transmitted by data processor 402 to transmission medium 102. Accordingly, control packet buffer may comprise any digital recording apparatus for temporarily storing a plurality of message signals. As an example, control packet buffer 412 may comprise random access memory for storing and retrieving digital information. As a further example, control packet buffer 412 may comprise a multi-stage register for performing the temporary recording function.

Data processor 400 is shown coupled to a logical ring list memory 416 for storing digital information therein and retrieving digital information therefrom. Logical ring list memory 416 is provided for storing the address of each BIU active in the local area network. As such, logical ring list memory 416 may comprise any digital recording apparatus capable of recording a plurality of BIU addresses. As an example, logical ring list memory 416 may comprise random accessor memory as is known in the art, for storing and retrieving digital information.

Data processor 400 is also shown coupled to a timer 414 for receiving an interrupt signal therefrom. Timer 414 is provided for measuring a predetermined token holding time. The token holding time is a time interval which is provided as the maximum time a BIU is permitted to transmit message signals while in control of the token. The token holding time may be typically determined as the time necessary to: (1) receive the token, (2) process the token, (3) transmit one maximum length message signal, and (4) transmit the token signal. However, the token holding time may be chosen as a time interval which allows transmission of two or more maximum length message signals. Accordingly, token holding timer 414 is provided for responding to a signal from data processor 400 to start measuring the token holding time and, upon elapse of this time interval, providing an interrupt signal to data processor 400. Accordingly, token holding timer 414 may comprise any timing device capable of performing this function.

In operation, network control center 108 is provided for monitoring transmission medium 102 to determine when either BIU transmits a next neighbor packet, thereby indicating its desire to be added to the logical ring. Next neighbor packet is used herein consistent with its usage in the aforereferenced IEEE 802.4 Standards, to wit, a media access signal used to identify the originator thereof. Further, the next neighbor signal is used as a media demand signal to indicate that an entering BIU wishes to be added to the logical ring.

Upon receipt of a next neighbor signal, network control center 108 is adapted to: (1) determine the position in the logical ring that entering station should be added, (2) to prepare next neighbor packets to be transmitted to the local area network such that the entering station may be added to the logical ring, and (3) update the logical ring list (a dedicated memory for storing addresses of stations which comprise the logical ring, i.e., memory 416 of FIG. 4).

In addition to performing the function of adding stations to the logical ring, as described above, network control center 108 is adapted for receiving each transmitted packet via left controller 108A and circulating the received packet through the logical ring via right controller 108B. This function is necessary when a subject BIU attempts to transmit packets to any BIU coupled to transmission medium 102 in the predominant direction with respect thereto. As mentioned hereinabove, each BIU 104 is adapted to receive packets only from the predominant direction and, hence, predominant stations are unable to receive packets transmitted by their subordinate station unless these packets are circulated by network control center 108. However, network control center 108 is adapted for circulating packets only once and, thereafter, removing the packet from transmission medium 102.

Figure 5:
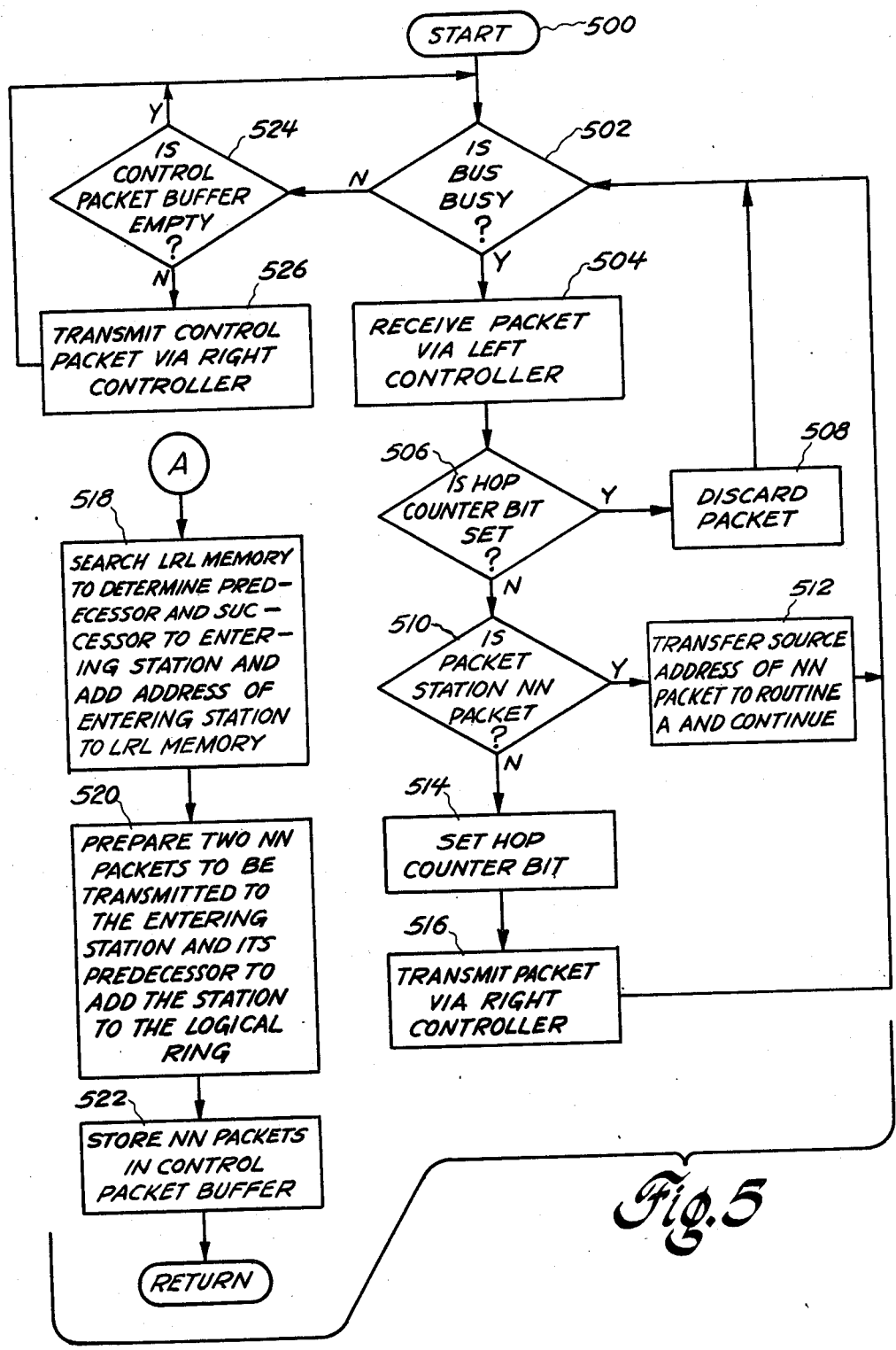
FIG. 5 provides a decisional flow diagram illustrating the method by which the network control center of the local area network of FIG. 1 adds entering stations to the logical ring.
Figure 6:
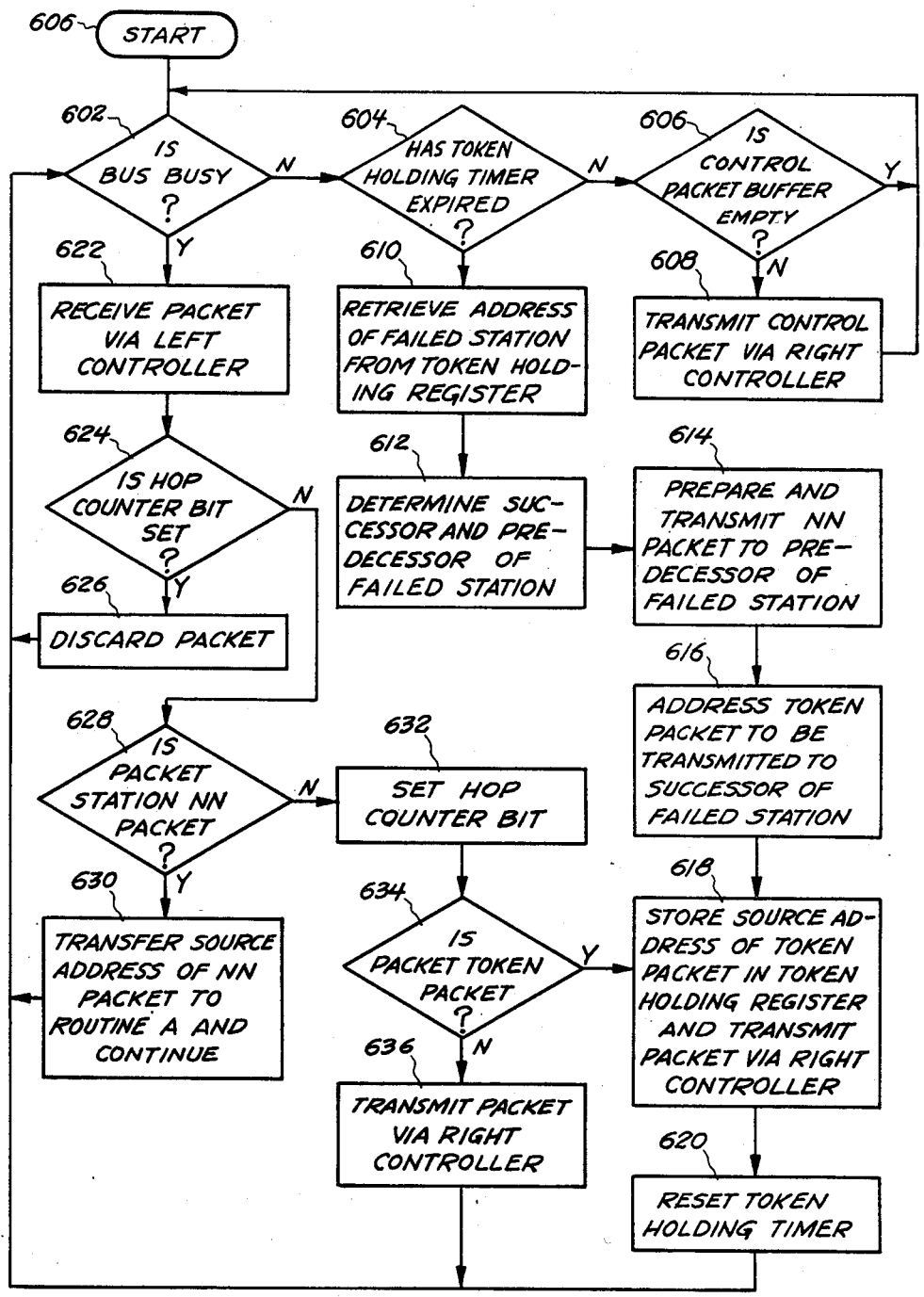
FIG. 6 provides a decisional flow diagram of an improved method for maintaining a dynamic logical ring.
Figure 7:
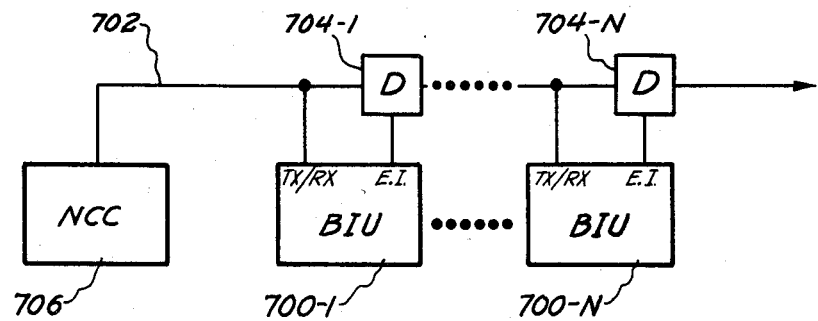
FIG. 7 provides an alternative embodiment of a local area network which uses the method and apparatus according to the present invention.

With reference to FIG. 5, there is provided an illustrative block diagram of the method by which network control center 108 performs the aforedescribed functions. Therein, the local area network is initialized in step 500 and the logical ring is established as will be described more fully hereinbelow. Network control center 108 continually monitors the transmission medium to determine whether a station is transmitting or whether the medium is idle, step 502. It will be appreciated by those skilled in the art that the decision of step 502 may be readily determined by monitoring the output of energy indicator 306 (FIG. 3). However, this method only determines when a predominant station is transmitting and does not truly determine that the transmission medium is idle, i.e., no predominant or subordinate station transmitting. This inadequacy will, however, be addressed by providing alternate embodiments discussed below and illustrated in FIGS. 7 and 8.

Returning to step 502, if network control center 108 determines that the transmission medium is busy, i.e., a predominant station is transmitting, then network control center 108 will receive the packet via left controller 108A, step 504. Thereafter, network control center 108 determines whether the hop counter bit of the received packet is set, step 506.

In the preferred embodiment, each packet transmitted to transmission medium 102 is provided with a hop counter bit which is used by network control center 108 to insure that each packet is circulated through the network only once. Accordingly, each packet transmitted by a station coupled to the network is transmitted with the hop counter bit not set. Each packet transmitted by network control center 108 is transmitted with the hop counter bit set. Hence, any message packet received wherein the hop counter bit is set has been circulated once completely through the network and must be removed therefrom. Conversely, any packet received wherein the hop counter bit is not set, has not been circulated through the network and must be circulated through the network if it is to be received by each station participating therein.

Therefore, if the hop counter bit is set, step 506, then network control center 108 will discard the received packet, step 508, and, thereafter, return to step 502 to again monitor transmission medium 102. If, however, the hop counter bit is not set, step 506, thereby indicating that the received packet was transmitted by a station as opposed to network control center 108, then network control center 108 will determine whether the received packet is a next neighbor packet, step 510.

If the received packet is a next neighbor packet, then this packet was transmitted by a station and intended to be received by the network control center such that the transmitting station may be added to the logical ring. Therefore, this packet need not be circulated through the local area network. Hence, network control center 108, upon determining that the received packet is a next neighbor packet, step 510, will transfer the source address of the next neighbor packet to routine A and return to step 502 where it will again monitor transmission medium 102.

It will be appreciated by those skilled in the art that routine A is a submethod of the subject method executed by the network control center to determine the position in the logical ring that an entering station should be added, and, further, to prepare two next neighbor packets to be transmitted to the local area network such that the entering station may be added to the logical ring as will be described more fully hereinbelow. Hence, routine A may be performed concurrently with the circulation of received message packets.

Returning to step 510, if network control center 108 determines that the received packet is not a next neighbor packet, then network control center 108 will set the hop counter bit of the received packet, step 514, and, thereafter, transmit the received packet via right controller 108B, step 516, such that the received packet will be circulated through the local area network.

It will be appreciated by those skilled in the art that since each packet transmitted by network control center 108 is transmitted with the hop bit counter thereof set, that when these packets are received by left controller 108A they will be discarded as described hereinabove with reference to steps 502 through 508. It will be further appreciated by those skilled in the art that data processor 402 is adapted to transmit message signals only when transmission medium 102 is idle to avoid destruction of an existing transmission.

After transmitting the received packet, step 516, network control center 108 will return to step 502 to again monitor transmission medium 102.

As mentioned hereinabove, routine A provides a subroutine wherein network control center 108 determines the position of the logical ring wherein the entering station should be added and prepares the next neighbor packets to be transmitted such that the entering station may be added to the logical ring. Routine A begins with step 518 wherein network control center 108 searches the logical ring list memory to determine the predecessor and successor to the entering station. The logical ring list memory is a dedicated memory location created for storing the addresses of stations participating in the logical ring, i.e., memory 416 of FIG. 4. In accordance with the method of the present invention, the token is passed from station to station in order of descending station address and the logical ring list memory is organized accordingly. Hence, the method of searching the logical ring list memory to determine the predecessor and successor to the entering station comprises the steps of determining the descending numeric order in which the entering stations address should be added to the logical ring list memory.

Upon determining the predecessor and successor to the entering station, network control center 108 will add the address of the entering station to the logical ring list memory, step 518. Thereafter, network control center 108 will prepare two next neighbor packets to be transmitted to the local area network such that the entering station may be added to the logical ring, step 520. The next neighbor packets transmitted may be any media entrance signal provided for adding the entering BIU to the logical ring. Network control center 108 will prepare one next neighbor packet to be transmitted to the predecessor of the entering station to inform the predecessor of the identity of its new successor, to wit, the entering station. Additionally, network control center 108 will prepare a next neighbor packet to be transmitted to the entering station to inform it of the identify of its successor, to wit, its predecessors former successor. After preparing the two next neighbor packets, step 520, network control center 108 will store the next neighbor packets in a control packet buffer, step 522. The control packet buffer is a buffer memory of network control center 108 provided for temporarily storing control message packets to be transmitted by right controller 108B to add entering stations to the logical ring.

In this regard, whenever network control center 108 determines that transmission medium 102 is not busy, step 502, then network controller 108 will check the control packet buffer, step 524, to determine whether there are any control packets to be transmitted and, if so, will transmit the control packets, step 526, and thereafter return to step 502.

In addition to performing the functions as outlined above, network control center 108 may be further adapted to reestablish the logical ring after a station has received the token and failed. An improved method for operating network control center 108 which includes this function may be described by reference to the decisional flow diagram of FIG. 6. Therein, the local area network is initiated in step 600 and the logical ring is established as will be described more fully hereinbelow. Network control center 108 continually monitors transmission medium 102, step 602, to determine whether the network is idle. If the network is not busy, then network control center 108 will determine whether token holding timer 414 (FIG. 4) has expired, step 604.

As mentioned hereinabove, token holding timer 414 is a timer contained within network control center 108 which is used to provide a limitation on the amount of time which a station is permitted to hold the token. Should a station hold the token for longer than is permitted by the token holding timer, then network control center 108 will assume the station possessing the token has failed and will remove that station from the logical ring and reestablish the logical ring as will be described below. If the token holding timer has not expired, step 604, then network control center 108 will check its control packet buffer, step 606, and transmit any control packets which may be contained therein, step 608, before returning to step 602 to again monitor transmission medium 102.

It will be appreciated by those skilled in the art that while the decision of step 604 is described herein as an active step taken by network control center 108, it may actually comprise the substep of token holding timer 414 being initiated by data processor 400 of left controller 108A and token holding timer providing an interrupt to data processor 400 upon expiration of the token holding time.

Should network control center 108 determine that the token holding timer has expired, step 604, then the network control center will remove the station possessing the token from the logical ring. To this end, the network control center will retrieve the address of the failed station from a token holding register, step 610. The token holding register is a register contained within network control center 108 which is dedicated for storage of the address of the station which is currently possessing the token packet. After retrieving this address, step 610, network control center 108 will search the logical ring list memory to determine the successor and predecessor of the failed station, step 612. Network control center 108 will thereafter prepare and transmit a next neighbor packet to the predecessor of the failed station, step 614, to inform the predecessor of the failed station of the identity of a new successor, to wit, the successor of the failed station. Thereafter, network control center 108 will address the token packet to be transmitted to the successor of the failed station, step 616, and will store the source address of the token packet in the token holding register and transmit the token packet, step 618. After transmitting the token packet, the network control center will reset the token holding timer, step 620, before returning to step 602 to again monitor transmission medium 102.

Returning to step 602, if it is determined that the transmission medium is busy, i.e., a packet is being transmitted, network control center 108 will receive the transmitted packet via left controller 108A, step 622 and will check the hop counter bit of the received packet to determine whether it is set, step 624. If the hop counter bit is set, then network control center 108 will discard the packet, step 626, and return to step 602 to again monitor transmission medium 102. If the hop counter bit is not set, then network control center 108 will determine whether the received packet is a next neighbor packet, step 628, indicating that the originating station desires to enter the logical ring. If the received packet is a next neighbor packet, then network control center 108 will transfer the source address of the next neighbor packet to routine A, step 630, such that next neighbor packets can be prepared and stored in the control packet buffer as discussed hereinabove with reference to FIG. 5. Concurrently with performance of routine A, network control center 108 will return to step 602 to again monitor transmission medium 102.

If the received packet is not a next neighbor packet, step 628, then network control center 108 will set the hop counter bit of the received packet, step 632, and, thereafter, determine whether the received packet is a token packet, step 634. If the received packet is not a token packet, then network control center will transmit the received packet via right controller 108B before returning to step 602 to again monitor transmission medium 102. If the received packet is a token packet, network control center 108 will store the source address of the token packet in the token holding register and transmit the token packet, step 618, reset the token holding timer, step 620, and return to step 602 to again monitor the transmission medium.

As mentioned above, because a station is unable to determine when another station coupled to transmission medium 102 in the subordinate direction with respect to the subject station is transmitting, that it is possible for a predominant station currently not in the logical ring to transmit a next neighbor packet while a subordinate station is transmitting. In the preferred embodiment, this results in the subordinate station terminating its transmission long enough for the entering station to complete transmission of its next neighbor packet and, thereafter, the subordinate station will repeat transmission of its terminated packet.

In an alternative embodiment, this problem is eliminated by providing a second channel along transmission medium 102 for transmission of a carrier signal indicating that a station is currently transmitting. In this embodiment, energy indicator 306 (FIG. 3) is coupled directly to transmission medium 102 to provide an indication to data processor 300 of the presence of the carrier signal along the carrier channel. With respect to the methods as described in FIGS. 5 and 6, each station and the network control center will now monitor the carrier channel, via energy indicator 306, to determine whether another station is transmitting before transmitting its packets.

It will be appreciated by those skilled in the art that alternative methods for providing a carrier channel exist, e.g., inband signaling wherein a carrier is provided at the edge of the information channel for transmission signaling purposes. Alternatively, a separate cable may be provided for this purpose.

In still a further embodiment, a bidirectional local area network may be provided such that each station coupled to transmission medium 102 can receive packets whether transmitted from predominant stations or subordinate stations. With reference FIG. 7, there is shown a bidirectional local are network wherein a plurality of bus interfacing units 700-1 through 700-N are each coupled to a bidirectional transmission medium 702. Each BIU is shown with both its transmitter and receiver coupled directly to transmission medium 702. Further, a plurality of respective directional coupling units 704-1 through 704-N are coupled to transmission medium 702 and, further, coupled to the energy indicator of its respective BIU 700. A network control center 706 is also coupled to transmission medium 702 for adding entering stations to the logical ring.

In this embodiment, each bus interfacing unit 700 is permitted to transmit information packets while in control of the token packet as described hereinabove. Further, each BIU 700 is adapted for terminating transmission of its packet if transmission is detected which originated from a BIU coupled to transmission medium 702 in the predominant direction with respect to the subject BIU. It will be noted by those skilled in the art that because each station can determine that a subordinate station is transmitting via its receive connection, the problem of entering stations preempting subordinate stations discussed above is resolved.

Network control center 706 is adapted for monitoring transmission medium 702 for transmission of a next neighbor signal indicating that a bus interface unit wishes to be added to the logical ring. After receipt of a next neighbor packet, network control center 706 will execute routine A as described hereinabove with reference to FIG. 5. Network control center 706 will further monitor transmission medium 702 until it is determined to be idle and, thereafter, will transmit packets from its control packet buffer as described hereinabove. It will appreciated by those skilled in the art that since each BIU is able to receive message packets whether transmitted from a predominant or subordinate BIU with respect thereto, then network control center 706 need not be adapted to receive and circulate each transmitted message packet. Further, message packets need not be provided with a hop counter bit as described hereinabove.

Figure 8:
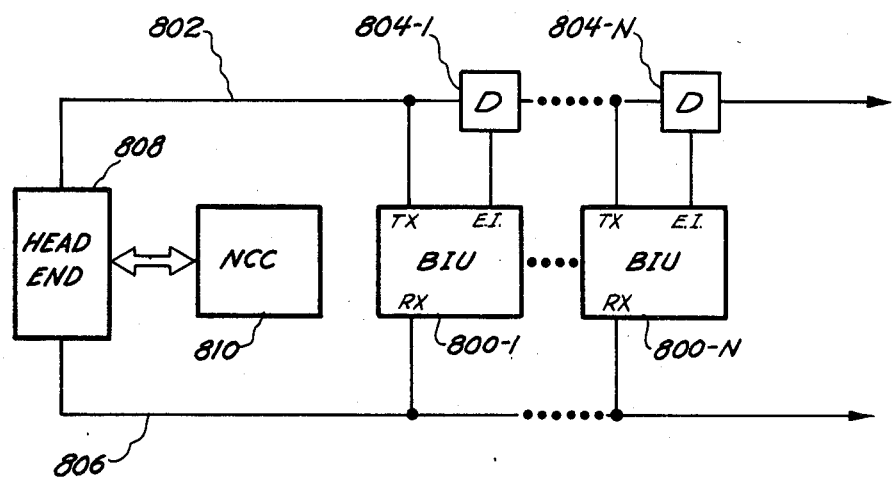
FIG. 8 provides still another alternative embodiment of a local area network which uses the method and apparatus according to the present invention.

In still a further embodiment, a head end may be provided such that transmissions and receptions can occur along the local area network transmission medium over a transmission channel and reception channel, respectively. With reference to FIG. 8, there is shown a local area network wherein a plurality of bus interfacing units 800-1 through 800-N are coupled for transmitting message packets to a common transmission medium 802. Each BIU 800-1 through 800-N includes an energy indicator coupled to transmission medium 802 via a respective directional coupling unit 804-1 through 804-N. Directional coupling units 804 are provided for allowing a subject BIU to determine when a BIU coupled to transmission medium 802 in the predominant direction with respect thereto is transmitting.

Each BIU 800-1 through 800-N is shown coupled directly to a common receive medium 806 for receiving message packets therefrom. Transmit medium 802 and receive medium 806 are interconnected via a head end or remodulator 808. Head end 808 may comprise any means for receiving alternating current modulated digital signals from transmission medium 802 and reconstructing the digital information contained therein before transmitting these message signals to receive medium 806. Additionally, where transmission medium 802 and receive medium 806 comprise the same physical cable, head end 808 may comprise a frequency translator such that packets are received from transmission medium 802 over a first frequency and transmitted to receive medium 806 over a second frequency, as is known in the art. Head end 808 may be readily provided by those skilled in the art from the description provided above.

Head end 808 is coupled for baseband communication to a network control center 810. Network control center 810 is provided for monitoring the transmission medium for receipt of a next neighbor signal indicating that an entering station wishes to be added to the logical ring. As described above, network control center 810 is responsive to receipt of a next neighbor packet for determining the position in a logical ring that the entering BIU should be placed and for transmitting two next neighbor packets to add the entering station to the logical ring. In the present embodiment, network control center 810 need not be adapted for circulating messages as each station is capable of receiving messages via receive medium 806 regardless of the originator of the packet. Further, each BIU 800 is capable of determining when a subordinate station is transmitting, via its receiver, and therefore an entering station will not preempt a transmitting subordinate station.

While only several presently preferred embodiments of this invention have been described in detail herein, many modifications and variations thereof will readily become apparent to those skilled in the art. It is my intent, therefore, by the paragraphs appended hereto, to include each modification and variation which is within the true scope and spirit of my invention.

What is claimed is:

1. Apparatus for maintaining a dynamic logical ring in a local area network including a plurality of active and passive stations, each having a unique station address, said active stations being adapted to transmit a media control signal from a predecessor station to a successor station in accordance with the order of the logical ring and to respond to said media control signal to transmit message signals within the network, said passive stations being adapted to enter the network by transmitting a media demand signal such that its address will be added to the logical ring to receive said media control signal, said apparatus comprising:

transmit means for transmitting and receiving message signals to and from said network, said transmit means being adapted to be coupled to said network;

memory means for recording the address of each station active in the local area network, said memory means being adapted to record said addresses in accordance with the order of the logical ring such that the order in which said media control signal is to be passed from station to station may be readily determined; and data processing means adapted for receiving said message signals and transmitting said message signals via said transmit means, said data processing means being responsive to said media demand signal transmitted by an entering station to search said memory means to determine a predecessor and a successor to said entering station, said data processing means being further reponsive to said media demand signal for transmitting media entrance signals to add said entering station to the logical ring, one said media entrance signal being transmitted to the predecessor of said entering station such that said entering stations predecessor will transmit said media control signal to said entering station and one said media entrance signal being transmitted to said entering station such that said entering station will transmit said media control signal to the successor of said entering station, thereby adding said entering station to the logical ring.

2. Apparatus as recited in claim 1 wherein said stations are adapted to generate media exit signals for indicating that a station is exiting the logical ring, and wherein said data processing means is responsive to said media exit signal to delete the address of its originator from said memory means.

3. Apparatus as recited in claim 1 wherein said data processing means is further adapted to monitor the network to detect when a station has maintained control of said media control signal for longer than is permitted by the network protocol and, thereafter, to remove the station from the logical ring.

4. Apparatus as recited in claim 3 wherein said media control signal includes a destination address to identify the recipient thereof, and wherein said data processing means further comprises:

time measurement means adapted to provide an interrupt signal after elapse of a predetermined media control time interval defined by the network protocol, said data processing means being responsive to each said media control signal for starting said time measurement means, said interrupt signal thereby indicating that a station has maintained control of said media demand signal for longer than is permitted by the network protocol; and register means for storing the destination address of said media control signal, said data processing means being further responsive to each said media control signal for recording its destination address in said register means and responsive to said interrupt signal to remove the station identified by the address recorded in said register means from the logical ring.

5. Apparatus as recited in claim 4 wherein said data processing means is adapted to be coupled to both ends of an open ring transmission medium, said data processing means being further adapted to circulate each transmitted message signal to insure receipt by each station of the network.

6. A local area network, comprising:
   a transmission medium;
   a plurality of bus interface unit (BIUs) means for interfacing a user with said network to transmit and receive message signals therebetween, each said BIU means being adapted to transmit and receive a media control signal wherein each said BIU means is responsive to receipt of said media control signal to transmit message signals in said network, each said BIU means being adapted to operate in an active mode wherein it is included in a logical ring such that it receives said media control signal from a predecessor and transmits said media control signal to a successor and wherein the order in which said media control signal is passed between said active BIU means is prescribed by the logical ring, each said BIU means being further adapted to operate in a passive mode during which it is not part of the logical ring and said media control signals are not passed to it by stations in the active mode, each said BIU means being further adapted to transmit a media demand signal for requesting entry to the logical ring; and
   network control means responsive to said media demand signal for determining the position in the logical ring for an entering BIU by determining a predecessor and a successor to said entering BIU means, said network control means being further responsive to said media demand signal for transmitting media entrance signals to add said entering BIU means to the logical ring, one said media entrance signal being transmitted to the predecessor of said entering BIU means such that the predecessor of said entering BIU means will transmit said media control signal to said entering BIU means and one said media entrance signal being transmitted to said entering BIU means such that said entering BIU means will transmit said media control signal to the successor of said entering BIU means.

7. A local area network as recited in claim 6 wherein each said BIU means has a unique BIU address and wherein said network control means further comprises means for recording the addresses of said active BIU means, said network control means being further responsive to said media demand signal to search said recording means to determine the address of a predecessor and a successor for said entering BIU means.

8. A local area network as recited in claim 7 wherein: each said BIU means is further adapted to transmit a media exit signal, said media exit signal for indicating that the originator thereof is exiting the logical ring; and wherein
   said network control means is responsive to said media exit signal for deleting the address of its originator from said recording means.

9. A local area network as recited in claim 8 wherein said network control means is further adapted to monitor said transmission medium to determine when a failed BIU means has maintained control of said media control signal for longer than is permitted by the network protocol and, upon making this determination, to remove said failed BIU means from the logical ring.

10. A local area network as recited in claim 9 wherein said media control signal includes a destination address to identify the recipient thereof, and wherein said network control means further comprises:
    time measurement means adapted to provide an interrupt signal after elapse of a predetermined media control time interval defined by the network protocol, said network control means being responsive to each said media control signal for starting said time measurement means, said interrupt signal thereby indicating that a station has maintained control of said media control signal for longer than is permitted by the network protocol; and
    register means for storing the destination address of said media control signal, said network control means being responsive to said media control signal for recording its destination address in said register means and responsive to said interrupt signal to remove the BIU means identified by the address recorded in said register means from the logical ring.

11. A method for maintaining a dynamic logical ring in a local area network wherein a media control signal is passed from predecessor station to successor stations along the ring, and wherein each station is responsive to said media control signal to transmit message signals over the transmission medium of said network, said method comprising the steps of:
    (a) monitoring said transmission medium for transmission of a media demand signal, said media demand signal for indicating that an entering station wishes to be added to the logical ring;
    (b) determining a predecessor and successor station for said entering station; and
    (c) transmitting media entrance signals to add said entering station to the logical ring, one said media entrance signal being transmitted to said entering station's predecessor such that it will transmit said media control signal to said entering station and one said media entrance signal being transmitted to said entering station such that said entering station will transmit said media control signal to said entering station's successor.

12. The method as recited in claim 11 further comprising the steps of:
    (d) monitoring said transmission medium for transmission of a media exit signal, said media exit signal indicating that the originator thereof is requesting to exit the logical ring; and
    (e) removing the originator of said media exit signal from the logical ring.

13. The method as recited in claim 12 further comprising the steps of:
    (f) monitoring said transmission medium to determine when a failed station has maintained control of said media control signal for longer than is permitted by the network protocol; and
    (g) removing said failed station from the logical ring.

14. The method as recited in claim 13 wherein the steps of determining that a station has maintained control of said media control signal for longer than permitted by the network protocol and removing the station from the logical ring comprises the substeps of:
    (h) monitoring said transmission medium for transmission of said media control signal;
    (i) recording the source address of said media control signal in a media control register;
    (j) responding to transmission of said media control signal to start a media control timer, said media control timer being adapted to provide an interrupt signal after elapse of a predetermined media control time interval as defined by the network protocol, said interrupt signal thereby indicating that a station has maintained control of said media control signal for longer than is permitted by the network protocol; and (k) responding to said interrupt signal to remove the station identified by the address stored in said media control register from the logical ring.

* * * * *